United States Patent
Benoit et al.

(10) Patent No.: US 6,495,231 B2
(45) Date of Patent: *Dec. 17, 2002

(54) EPOXY COATED MULTILAYER STRUCTURE FOR USE IN THE PRODUCTION OF SECURITY DOCUMENTS

(75) Inventors: Gordon L. Benoit, Victor, NY (US); Dennis E. McGee, Penfield, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 27 days.

This patent is subject to a terminal disclaimer.

(21) Appl. No.: 09/732,124

(22) Filed: Dec. 7, 2000

(65) Prior Publication Data

US 2001/0000236 A1 Apr. 12, 2001

Related U.S. Application Data

(60) Continuation of application No. 09/325,509, filed on Jun. 3, 1999, now abandoned, which is a continuation-in-part of application No. 09/025,182, filed on Feb. 18, 1998, now Pat. No. 6,025,059, which is a continuation-in-part of application No. 08/872,988, filed on Jun. 11, 1997, which is a continuation-in-part of application No. 09/064,993, filed on Apr. 23, 1998, now Pat. No. 5,879,028, and a continuation-in-part of application No. 08/467,484, filed on Jun. 6, 1995, now Pat. No. 6,272,610, which is a division of application No. 08/266,918, filed on Jun. 27, 1994, now Pat. No. 5,698,333.

(51) Int. Cl.[7] ............................................. B32B 27/32
(52) U.S. Cl. .................. 428/46; 428/195; 428/413; 428/516; 428/910; 428/105
(58) Field of Search ................. 428/910, 515, 428/516, 195, 413, 46, 105

(56) References Cited

U.S. PATENT DOCUMENTS

| | | | |
|---|---|---|---|
| 3,719,629 A | 3/1973 | Martin et al. | 260/33.2 EP |
| 4,095,217 A | 6/1978 | Tani et al. | 340/324 R |
| 4,214,039 A | 7/1980 | Steiner et al. | 428/414 |
| 4,281,208 A | 7/1981 | Kuwano et al. | 136/249 |
| 4,377,616 A | 3/1983 | Ashcroft et al. | 428/213 |
| 4,447,494 A | 5/1984 | Wagner, Jr. et al. | 428/349 |
| 4,472,627 A | 9/1984 | Weinberger | 235/487 |
| 4,536,016 A | 8/1985 | Solomon et al. | 283/111 |
| 4,632,869 A | 12/1986 | Park et al. | 428/315.5 |
| 4,680,207 A | 7/1987 | Murray | 428/35 |
| 4,681,803 A | 7/1987 | Liu et al. | 428/248 |
| 4,758,462 A | 7/1988 | Park et al. | 428/213 |
| 4,870,122 A | 9/1989 | Lu | 524/488 |
| 5,264,277 A | 11/1993 | Frognet et al. | 428/315.5 |
| 5,288,548 A | 2/1994 | Weber | 428/315.9 |
| 5,618,630 A | 4/1997 | Benoit et al. | 428/500 |
| 5,662,985 A | 9/1997 | Jensen et al. | 428/195 |
| 5,698,333 A | 12/1997 | Benoit et al. | 428/516 |
| 5,716,695 A | 2/1998 | Benoit et al. | 428/195 |
| 5,879,028 A | 3/1999 | Benoit | 283/72 |
| 5,935,696 A * | 8/1999 | Benoit et al. | 283/109 |
| 6,025,059 A * | 2/2000 | McGee et al. | 428/219 |

FOREIGN PATENT DOCUMENTS

| | | |
|---|---|---|
| AT | 488652 | 4/1975 |
| FR | 2323813 | 4/1966 |
| GB | 1287527 | 8/1972 |
| GB | 2299036 | 9/1996 |
| WO | WO9701438 | 1/1997 |
| WO | WO0018575 | 4/2000 |

* cited by examiner

*Primary Examiner*—D. Lawrence Tarazano
(74) *Attorney, Agent, or Firm*—Rick F. James; Keith A. Bell

(57) ABSTRACT

A laminated multilayer film substrate for use in the production of banknotes having an oriented polypropylene core layer and at least one high density polyethylene layer on each side of the oriented polypropylene layer. The core layer may contain microcavities formed by the addition of a cavitating agent. The outer surfaces of the multilayer film substrate are coated with one or more epoxy layers, filed or unfilled, and one or more antistatic layers. The resultant films exhibit good embossability, dead-fold characteristics and other properties, making them highly suited for the production of bank notes and other security documents.

21 Claims, No Drawings

EPOXY COATED MULTILAYER STRUCTURE FOR USE IN THE PRODUCTION OF SECURITY DOCUMENTS

RELATED APPLICATIONS

This application is a continuation of U.S. application Ser. No. 09/325,509, filed Jun. 3, 1999, abandoned, which is a continuation-in-part of U.S. application Ser. No. 09/025,182, filed Feb. 18, 1998 U.S. Pat. Nos. 6,025,059, and 09/162,219, filed Sep. 28, 1998, which is a continuation-in-part of U.S. application Ser. No. 08/872,988, filed Jun. 11, 1997; 09/064,993 U.S. Pat. No. 5,879,028, filed Apr. 23, 1998; and 08/467,484, filed Jun. 6, 1995, U.S. Pat. No. 6,272,610, which is a divisional of U.S. application Ser. No. 08/266,918, filed Jun. 27, 1994, now U.S. Pat. No. 5,698,333, the entire disclosures of which are incorporated herein by reference.

FIELD OF THE INVENTION

The present invention relates to a multilayer film for use in the production of paper-like products such as bank notes, security documents, including travelers and bank checks, and to a method for their production. More particularly, the present invention relates to a multilayer film having the characteristics of the high quality papers typically employed in the production of bank notes and security documents.

BACKGROUND OF THE INVENTION

In the production of bank notes, security documents and the like, rag paper has been employed for more than 300 years. As is well known, rag paper has several properties which are highly desirable in such applications, including dead foldability, tear resistance, printablilty and embossability.

These highly desired properties may be characterized as follows: deadfold is the ability of a substrate to be creased or folded and to retain the fold without opening. Tear resistance is the ability of a substrate to resist both initiated and uninitiated tears and punctures. Printability is the ability of the substrate to adsorb and bond inks used during the lithographic printing process. Embossability is the ability of the substrate to deform under the pressures of the intaglio printing process to form a raised image on the resulting bank note or security document, with the intaglio ink remaining on the raised, deformed region resulting in a high degree of tactility or feel to the bank note or security document. As may be appreciated, these properties combine to give bank notes and the like their familiar feel and functionality.

With the advent of color copiers and computer graphic scanners, the counterfeiting of bank notes has markedly increased. While there are active programs underway by major currency paper producers to make their substrate more secure through the use of watermarks, metallized threads and optical variable devices (OVD's), such as photochromics, holographics, and diffraction gratings, at this time, these efforts do not appear to hold much promise of thwarting counterfeiters.

Plastic substrates offer a major security feature if a clear "window" is incorporated into the bank note. This window would ensure that a scanner or color copier could not copy the note. Additionally, other security features can be incorporated into or onto the bank note, including reverse printing of the note to protect the security devices and the print.

Australian Pat. No. 488,652, discloses an approach to the production of security articles, particularly bank notes, and describes the serious problems which confront conventional bank notes with respect to forgery. The bank note disclosed therein comprises a substrate of opaque thermoplastic sheet material intimately bonded to a web of woven or unwoven thermoplastic fibers, the substrate being printed as desired and having bonded thereon one or more optically-variable security devices. The fibrous web was employed to impart durability, crumple-resistance resistance and tear-strength to the note. Where a security device, such as a Moire pattern, was employed which depended for its optically variable properties upon the transmission of light, it was necessary to punch out a hole in the substrate, insert the device and bond it in place with further layers of transparent plastic sheet material.

Although samples of bank notes formed according to the disclosure of Australian Pat. No. 488,652 were said to have performed most satisfactorily with respect to the durability and security of conventional notes, they were found to be rather complex in construction and relatively expensive to produce. Moreover, when transmission security devices were laminated between layers in the substrate, an area of weakness and high stress was created which reduced both durability and security.

Other disclosures relating to anti-counterfeiting techniques include U.S. Pat. Nos. 4,095,217 and 4,281,208, which relate to the use of a liquid crystal device driven by a photovoltaic element, such as a solar cell or an amorphous silicon material.

U.S. Pat. No. 4,472,627 relates to currency or other valuable documents containing a liquid crystal/ photovoltaic device which produces a coded display in response to artificial or ambient light. The device can function both as an anti-counterfeiting deterrent and also as a means for permitting a user to easily authenticate the validity of a document containing such a device.

U.S. Pat. No. 4,536,016 discloses a security token, such as a bank note or identity card, which comprised a sheet-like substrate made up from film of transparent biaxially oriented polymer coated with layers of opaque and heat activated adhesive material. The opaque layer is applied in such a way as to leave a transparent area for inspection of a security device, for example, a diffraction grating, incorporated in the polymer film. The substrate could bear printed or other identifying indicia and was protected with an intimately bonded layer of transparent polymeric material.

The substrate employed in U.S. Pat. No. 4,536,016 was based on the use of oriented polypropylene (OPP). After several commemorative bank note printings, while meeting many of the requirements for a bank note substrate, the plastic bank notes were found to fail in three major areas. First, the OPP substrate did not dead fold, causing problems in that the film retains either a flat or curved form, jamming cash registers and automatic handling equipment. Second, the OPP substrate has poor initiated tear resistance in the processing of currency, which quite frequently creates nicks on the edges of bills, resulting in catastrophic tears. Finally, the OPP product did not exhibit the tactility of paper currency, due to the fact that OPP does not emboss well during the intaglio process.

Oriented high density polyethylene films have been employed in the area of plastic packaging. Such films, biaxially oriented to a degree of greater than 6.5 times in both the machine direction (MD) and the transverse direction (TD) are described in British Patent 1,287,527. U.S. Pat. No. 4,680,207 relates to imbalance biaxially oriented films of linear low density polyethylene oriented up to six times in the machine direction, and up to three times in the transverse direction but less than in the machine direction.

U.S. Pat. No. 5,618,630 relates to a three-ply multilayer film structure for the production of banknotes.

While the aforementioned films have been shown to offer certain advantages over the prior art and generally meet the requirements for which they were designed, a need still exists for a film which provides the characteristics of a high quality, rag-type paper of the type typically employed in the production of bank notes and security products.

Therefore, it is an object of the present invention to provide a multilayer film having the characteristics of a high quality rag paper.

It is another object of the present invention to provide such a multilayer film which possesses the dead-fold characteristics of high quality papers while being easy to manufacture and reasonably durable.

It is a further object of the present invention to provide a multilayer film which possesses a high degree of tear resistance to both initiated and uninitiated tears and punctures in at least one direction.

It is yet another object of the present invention to provide a multilayer film which possesses the printability and embossability of a high quality paper.

It is still a further object of the present invention to provide a multilayer film which possesses a high degree of resistance to curling at higher temperatures, e.g., above 150° F.

Still another object of the invention is to provide a multilayer film which is suitable for banknote production from which it is difficult to abrade inks resulting in banknotes of long service life. Such films can achieve high levels of durability without overlaying the inked surface with protective coatings such as lacquers or polyurethanes.

When money is circulated, it becomes soiled by contact with other materials, especially other money (coins and notes). If ink is rubbed into unprinted areas the results are undesirable. Likewise coins should not leave marks on the notes when the two are rubbed together. Therefore, a further object of the present invention is to provide inks and print surfaces that are abrasion resistant but cannot be overly abrasive.

Other objects and the several advantages of the present invention will become apparent to those skilled in the art upon a reading of the specification and the claims appended thereto.

SUMMARY OF THE INVENTION

The multilayer film of the present invention is a three-ply structure. In a preferred embodiment, at least one layer of oriented polypropylene (OPP) is surrounded by at least one layer of high density polyethylene (HDPE) on either side of the OPP layer. The multilayer film of the present invention comprises one or more epoxy layers to provide coating adhesion and opacity as well as provide a surface for receipt of an ink print image. The multilayer film of the present invention further comprises one or more antistatic layers to improve processability. The film substrate to be coated can be a clear or opaque structure.

The multilayer film of the present invention exhibits good performance in repetitive fold tests. The multilayer film structure of the present invention also has high tensile strength in both the oriented and unoriented direction. The multilayer clear structure of the present invention does not craze when crumpled in the print window.

In accordance with the present invention, there is provided a curl-resistant, cross-sectionally symmetrical, laminated multilayer film substrate for use in the production of banknotes, security papers and the like comprising:

(a) an imbalanced biaxially oriented first layer having inner and outer sides, comprising at least about 50 weight percent of a high density polyethylene having a density of at least about 0.94, said first layer being oriented in at least a first direction to a degree which is at least three times less than the degree of orientation present in a second direction substantially normal to the first direction wherein (a) further comprises a coextruded propylene copolymer skin on its inner side;

(b) a balanced biaxially oriented second layer having inner and outer sides, comprising at least about 90 wt. % polypropylene, said second layer being oriented in at least a first direction, at an orientation ratio of at least 4:1, and oriented in a second direction substantially normal to said first direction, at an orientation ratio of at least 6:1;

(c) an imbalanced biaxially oriented third layer having inner and outer sides, comprising at least about 50 weight percent of a high density polyethylene having a density of at least about 0.94, said third layer being oriented in at least a first direction to a degree which is at least three times less than the degree of orientation present in a second direction substantially normal to the first direction; and (d) a laminating adhesive resin disposed between the inner sides of (a) and (c), said second layer being laminated to said first and third layers so that the first direction of orientation of said third layer is substantially aligned with the first direction of orientation of said first layer and wherein the outer sides of both (a) and (c) further comprise at least one epoxy layer and at least one antistatic layer.

DETAILED DESCRIPTION OF THE INVENTION

In forming the multilayer film of the present invention at least one layer of the substrate comprises oriented polypropylene. The use of oriented polypropylene in the core results in high tensile properties and high performance in repetitive fold tests. In addition, there is no crazing in the print windows after hand crumpling when using the three-ply clear structure of the present invention.

It is preferred to use oriented polypropylene (OPP) in the core. However, other biaxially oriented polymers of a comparable tensile strength, such as linear low density polyethylene (LLDPE), nylons or polyester may also be used. It is preferred that the OPP core be free of any additives, for example, antistatic agents and silicone, which have an impact on adhesion to other layers.

The core layer of the present invention may also comprise a plurality of voids formed by cavitation about a solid cavitation agent, such as polybutylene terephthalate and/or calcium carbonate. Polybutylene terephthalate, e.g., 0.2 to 2 microns in diameter, as described in U.S. Pat. Nos. 5,288,548; 5,267,277; and 4,632,869, the contents of which are incorporated herein by reference, is a suitable cavitation agent. The spherical particles form microvoids on orientation, resulting in a white opaque product.

In forming the multilayer film substrates for use in the production of the bank notes and other security documents of the present invention, at least two layers of the substrate are to contain a major proportion of a high density polyethylene (HDPE) having a density of at least about 0.94, preferably at least about 0.945. These film layers may be composed exclusively of a single HDPE resin, a mixture of HDPE resins, or of HDPE containing a minor proportion of another polymeric material, such as low density polyethylene (LDPE), linear low density polyethylene (LLDPE), polypropylene, ethylene vinyl alcohol (EVOH) copolymer, ethylene propylene (EP) copolymer, ethylene propylene butene-1 (EPB) copolymer, polyetser or nylon, although a single HDPE resin or a blend of HDPE resins is particularly preferred in the practice of the present invention. Films made with either a blend of HDPE resins or with microcrystalline wax have been found to reduce the splittiness of the film which manifests itself as the tendency of the film to break in the TD direction.

When blends of HDPE polymers are employed, such blends can comprise two or more polymers all of which preferably have densities of 0.94 or greater. Blends of HDPE polymers advantageously comprise a major proportion of HDPE having a melt index of 0.6 to 1.2 and one or more polymers having a different melt index.

Terblends may also be desirable. Suitable terblends generally comprise 50 to 98 weight percent, preferably 84 to 96 weight percent of HDPE having a density of 0.96 or higher and a melt index of greater than 0.5 to about 2.0; 1 to 25 weight percent, preferably 3 to 8 weight percent of HDPE having a density of 0.94 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

As is particularly preferred, the film substrate of the present invention includes a) a first layer comprising at least about 50 weight percent of a high density polyethylene having a density of at least about 0.94, the first layer oriented in at least a first direction, e.g., machine direction (MD), to a degree which is at least three times less than the degree of orientation present in a second direction substantially normal to the first direction, e.g., transverse direction (TD); (b) a second layer comprising at least about 90wt. % polypropylene, the second layer being oriented in at least a first direction e.g., machine direction (MD), at an orientation ratio of at least 3:1, and oriented in a second direction substantially normal to said first direction e.g., transverse direction (TD), at an orientation ratio of at least 6:1; and c) a third layer also comprising at least about 50 weight percent of a high density polyethylene having a density of at least about 0.95, the third layer also oriented in at least a first direction, e.g., MD, to a degree which is at least three times less than the degree of orientation present in a second direction, e.g., TD, substantially normal to the first direction, the third layer being laminated to the film substrate so that the first direction of orientation of the third layer is substantially parallel to (or aligned with) the first direction of orientation of the first layer.

A method of producing HDPE films with imbalanced biaxial orientation is disclosed in U.S. Pat. No. 4,870,122, the contents of which are incorporated by reference in their entirety.

As may be appreciated, to achieve the object of improved tear resistance in a multilayer film of the type describe herein, it has been discovered that imbalanced biaxially oriented HDPE films, laminated so that their primary directions of orientation are aligned substantially parallel to each other, can exhibit increased tear resistance where an orientable laminating resin, e.g., polyurethane, is disposed between the layers and subjected to orienting so that the primary direction of orientation in the oriented resin is substantially normal to the primary direction of orientation of the first and third HDPE film layers. In one embodiment, such orientation in the primary direction of orientation of the laminating adhesive resin is achieved during the laminating step itself, preferably in the machine direction (MD).

The degree of orientation of the HDPE film layers is an important aspect of this invention inasmuch as the proper degree of orientation provides desirable physical properties. Although higher density HDPE resin having a density of 0.957 or greater can be made directly into thin films by cast extrusion, problems of curling, uniformity and flatness exist. Accordingly, thin HDPE films of about 0.8 to 1.5 mils having the best balance of properties are obtained using imbalanced biaxially oriented films prepared from films having a cast gauge of 4 to 15 mils which are reduced to the desired gauge by stretching, i.e., orientation.

The films are produced and oriented in a conventional manner. The film is heated to its orientation temperature and first subjected to MD orientation between two sets of nip rolls, the second rotating at a greater speed than the first in an amount equal to the desired draw ratio. Then the film is TD oriented by heating and subjecting it to transverse stretching in a tenter frame. Typically MD orientation is conducted at 60 to 120° C. and TD orientation at 110 to 145° C.

While it is preferred that the degree of orientation in a first film direction be at least three times less than the degree of orientation present in a direction substantially normal to the first direction, it is more particularly preferred that each HDPE film layer be oriented to an extent of about 1.1 to about 2.0 times in the machine direction (MD) and about 6 to about 12 times in the transverse direction (TD). It has been found that the HDPE film layers can be produced with excellent quality at caster speeds of up to about 110 feet per minute (fpm) corresponding to line speeds of 140 fpm at 1.25 times MD orientation. In the alternative, the degree of orientation in a first film direction can be at least three times greater than the degree of orientation present in a direction substantially normal to the first direction. Even unoriented blown HDPE may be used as the first and third layers and still maintain some degree of deadfold in the multilayer film substrate of the present invention.

When employed, this degree of imbalanced orientation produces an interesting effect in the HDPE components of the structure. The effect is a visible rippled and striated appearance, with the ripples being parallel to the transverse orientation direction. Under low magnification, in each square centimeter of HDPE film there will be seen from about 5 to about 30 discontinuous undulating ripples and striations generally parallel to the direction of orientation. This effect gives the film a slight translucent appearance, which tends to slightly blur distant objects viewed through the film. This effect indicates that the layers have been oriented in an imbalanced manner. The high density polyethylenes contemplated for use in the practice of the present invention include those disclosed in U.S. Pat. No. 4,870,122.

In the oriented polypropylene layer the orientation is adjusted to give essentially balanced tensile properties in both directions.

To achieve the desired surface characteristics required of the paper-like products of the present invention, one or more skin layers can be applied, in any known manner, to the multilayer HDPE substrate material, for example by coating or coextrusion before orientation or by coating the HDPE after one or both of the orientation operations. The skin layer can be any of the conventional materials used for this purpose in conjunction with polyolefin films, particularly polyethylene films. For example, to achieve a press-ready surface, a polymeric resin could be blended with fillers, fibers, pigments or the like, as necessary.

Additionally, voided films, such as those disclosed in U.S. Pat. Nos. 4,377,616, 4,632,869, 4,758,462 and others, may be laminated to the multilayer HDPE substrate to impart the opacifying properties of those structures to the films of the present invention.

The HDPE-containing layers (a) and (c) as disclosed above can further comprise copolymer polypropylene skins, e.g., ethylene-propylene-butane 1 terpolymer, provided on at least one side thereof, preferably on both the inner and outer sides thereof. In one embodiment, the skins themselves can also comprise a component which is similar to components in the adhesive resin used to laminate layers (a), (b) and (c). For example, low density polyethylene (LDPE) can make up from 10 to 20 wt % of the skins, with the balance being a copolymer polypropylene.

A suitable adhesion-promoting primer which provides greater adhesion between the laminated surfaces, e.g., polymers selected from the group consisting of polyethyleneimide, epoxy, polyurethane, and acrylic, can be provided between the copolymer polypropylene skins (on the inner sides of (a) and (c)) and the laminating adhesive resin. Primer compositions are disclosed in U.S. Pat. Nos. 4,447,494 and 4,681,803, which are incorporated herein by reference.

The multilayer film of the present invention comprises one or more layers of epoxy coating. The outermost layer is an epoxy print cap. Underlying epoxy opacifying layers comprising fillers, such as titanium dioxide, are also included to provide coating durability and opacity. Additional functional coated layers on the multilayer film can be used, if desired, to improve the antistatic properties of the final structure, introduce additional security features, and/or enhance opacity.

The outer epoxy layer is for printing by lithography, intaglio and other types of printing methods. Hydrophobic filler, such as surface treated clays and hydrophobic titanium dioxide improve wet-scratch resistance. Hydrophobic clay fillers are preferred over coatings filled with calcium carbonate, titanium dioxide and/or epoxy based coatings without filler because they are less abrasive.

The epoxy print cap provides excellent wet-scratch resistance while at the same time affording good ink gloss, print image, and tack up times.

The epoxy coating (or epoxy binder) used to form the layers on the three-ply structure of the present invention is the reaction product of an epoxy resin and an acidified aminoethylated vinyl polymer, which is used as a hardener or curing agent. A description of such epoxy coatings is found in U.S. Pat. No. 4,214,039 to Steiner et al., which is herein incorporated by reference.

The epoxy resin can be defined as glycidyl ethers of polyhydroxy compounds. Polyhydroxy compounds that can be used include, but are not limited to, bisphenol A (common name for 4,4'-isopropylidene bisphenol), ring substituted bisphenol A, resorcinol, hydroquinone, phenol-formaldehyde novolac resins, aliphatic diols, such as ethylene glycol, propylene glycol, 1,4'-butanediol, 1,6 hexanediol glycerol, poly(oxyethylene)glycol, poly(oxypropylene) glycol, and the like. A preferred class of epoxy resins includes derivatives of bisphenol A.

The epoxy resins to be used are commonly classified by their epoxy equivalent weight (E.E.W.), which is defined as the gram weight of resin that contains one gram equivalent of epoxy groups. Resins with an E.E.W. ranging from 170 to 280 can be used with the present invention, with resins having an E.E.W. of 180 to 210 being preferred.

Other types of epoxy resins based on aliphatic diols and having E. E.W.'s ranging from about 150 to about 380 can also be used in mixtures with bisphenol A resins where increased flexibility of the resulting layer is desired.

Although the specific structure of the epoxy resin is not critical to the epoxy coating, considerations in the selection of the epoxy resin revolve around its physical state. For example, the resin should be a liquid and capable of being readily dispersed or dissolved with the acidified aminoethylated vinyl polymer (i.e., hardener), which is as described below. If the epoxy resin is of low viscosity, it can be stirred directly into the hardener.

Preferably, the epoxy resin is dispersed in an aqueous emulsion for ease of handling. A commercially available emulsified epoxy resin is Daubond®42X6311 from Daubert Chemical Company, Inc., in Chicago, Ill.

An alternative to emulsifiers is to substitute a hydantoin compound for bisphenol A. For example, 1,1-dimethyl hydantoin can be employed as a low molecular weight epoxy resin since resins based on this material are completely water soluble thereby eliminating the necessity for emulsification.

The liquid epoxy resin can be dispersed in a solution of hardener by rapid stirring. The resultant dispersion can be diluted with water and/or alcohol to the desired solids concentration for use as the coating or binder. When a completely water soluble epoxy resin is employed, simple mixing of aqueous solutions of the resin and the hardener is sufficient to produce a clear, infinitely dilutable, coating solution. The solids content of the coating solution prior to the addition of mineral fillers or other opacifying agents, such as titanium dioxide or clays, in the emulsion, can range from about 2 up to about 35% solids, with 15 to about 30% solids more preferred. Although it is difficult to obtain a stable dispersion at low concentrations since the epoxy resin tends to separate in large globules rather than remain in minute emulsified droplets, it has been found that usable products may be produced using this system.

A solid epoxy resin can be emulsified in water employing a non-ionic emulsifying agent. A stable, fine particle size emulsion containing about 50% epoxy resin may be readily prepared utilizing known prior art techniques. Opacifying agents can be added to the emulsion to make a grind paste. The opacifying agents may be ground using conventional methods including a Cowles mixer, ball mill, or other well-known dispersion methods. To facilitate the dispersion of the opacifying agents, water, alcohol or other suitable dispersion aids may be added. This dispersion may be subsequently stirred into the solution of the previously described hardener, either before or after dilution to the desired solids concentration.

The second component of the epoxy coating is the water soluble, acidified aminoethylated vinyl polymer, which is used as the hardener or primary curing agent. The preferred material is described in U.S. Pat. No. 3,719,629, which is incorporated herein by reference, and may be generically described as an acidified aminoethylated vinyl polymer having pendant amino alkylate groups of the general formula:

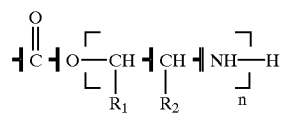

wherein $R_1$ and $R_2$ are hydrogen or lower alkyl radicals and the average value of n is in the range of about 1.0–2.5.

As described U.S. Pat. No. 3,719,629, the hardener is produced by polymerizing acrylate, methacrylate, styrene or other suitable monomers with sufficient methacrylic or acrylic acid to give a—COOH content of about 7.5 to about 12.5%. Solvent polymerization techniques are preferred. The polymer is thereafter reacted with an ethylene imine monomer and acidified with hydrochloric acid to render the polymer water soluble. A commercially available epoxy hardener is NSK7000, manufactured by Nippon Shokubai Co., Ltd., in Tokyo, Japan. The hardener contains approximately 50% resin in an ether/water solvent system. The resin has an amine hydrogen equivalent weight of between 350 and 450. This clear viscous solution is capable of being diluted infinitely with water.

When mixing the epoxy resin with the hardener, it is generally preferred to use a stoichiometric equivalent balance of epoxy and amine groups. However, the stoichiometric ratio can be varied over a wide range, from about 1 epoxy to about 3 amine through 3 epoxy to 1 amine, with about 1 epoxy to 2 amine through about 2 epoxy to 1 amine being more preferred. The actual stoichiometric ratio does not seriously affect the product's usefulness.

The epoxy binder can also contain various wetting aids and secondary curing agents. For example, the solution or dispersion of epoxy resin and hardener when applied to the substrate may not "wet-out" uniformly, especially when such materials are applied in very thin layers. As a result, the dry but as yet uncured liquid mixture may retract into droplets or "islands."

To improve the "wet-out" of the coating, small amounts of high boiling (above 100° C.) wetting aids, from 0.5 up to about 10% by weight of the total solids, can be used. Any conventional non-ionic wetting agents can be employed. However, optimum results are obtained utilizing partially water-soluble organic compounds having hydrophilic groups attached to hydrophobic groups. Examples of such compounds include, but are not limited to, the hexyl or benzyl ether of ethylene glycol, the hexyl ether of diethyl glycol, butyl alcohol, hexyl alcohol, octyl alcohol, diacetone alcohol, and the like. One such preferred wetting aid is the hexyl ether of diethyl glycol also known as Hexyl Cellosolve, which is commercially available from Union Carbide. Larger amounts of low boiling (less than 100° C.) wetting aids, from more than about 5% by weight of the total solids, can be used with, or in the alternative of high-boiling wetting aids. Preferred low-boiling wetting aids include n-propyl alcohol and isopropyl alcohol.

A secondary curing agent can also be added to the binder in a ratio of 0.5 to 15 parts per 100 parts of dry epoxy resin to enhance the rate of cure. Such curing agents can include, but are not limited to, propylene diamine, hexamethylene diamine, diethylene triamine, triethylamine, tetraethylene pentamine and the like. In addition, aliphatic polymeric amines can be employed such as poly(ethyleneimine) and poly(propyleneimine). Aromatic amines including tri(dimethyl aminomethyl) phenol can also be employed. Likewise, mixtures of the secondary curing agents can also be used.

A preferred secondary curing agent is poly(ethyleneimine). One such poly(ethyleneimine) resin commercially available is EPOMIN™ P-1050 available from Nippon Shokubia Co., Ltd., located in Tokyo, Japan. The EPOMIN™ resins contain a semi-linear polymer having branched chains of primary, secondary and tertiary amines. The P-1050 grade resin is a clear viscous liquid containing 50wt. % resin Opacifying agents (fillers) in the epoxy print cap are added per 100 parts binder, at minimum level of about 50 parts per hundred resin (phr), with about 75 phr being preferred, and about 90 phr being more preferred. Maximum levels of filler material per 100 parts binder should not exceed more than about 300 phr, with no more than about 250 phr being preferred and no more than about 160 phr being more preferred.

Epoxy opacifying coatings for underlying layers can be formed with the same methods used to make the print cap. However, fillers in the epoxy opacifying layers are added per 100 parts alcohol or solvent based binder, at minimum level of about 100 phr, with about 150 phr being preferred, and about 200 phr being more preferred. Maximum levels of filler material per 100 parts binder should not exceed more than about 350 phr, with no more than about 300 phr being preferred and no more than about 250 phr being more preferred. Titanium dioxide is the preferred filler for the opacifying coating.

In general, opacifying agents for the print cap or opacifying coatings can be any conventional filler material used in printing applications. Examples of such materials include, but are not limited to, silica, clays, zinc oxide, tin oxide, talc, Tospearl™, surface modified clays, for example hydrophobic clay, surface-modified silicas, titanium dioxide ($TiO_2$), surface-modified $TiO_2$ and calcium carbonate. The filler materials are classified into two functional groups: hydrophilic fillers and hydrophobic fillers.

The hydrophilic fillers include silicas, clays, zinc oxide, tin oxide and talc. They are referred to as hydrophilic due to the ability to absorb water, which is measured by pore volume or porosity. The hydrophilic filler materials preferably have a low porosity or are non-porous. In the context of the present invention, low porosity means a porosity less than 3 milliliters/gram (ml/g), with less than 1.5 mug being preferred and less than 0.5 ml/g being more preferred. Low porosity and non-porous fillers have been found to provide the coated substrate with better overall properties than their more porous counterparts. A preferred low porosity filler is silica since it can be obtained in various grades of porosity and particle size. Examples of commercially available low porosity silicas are silica gels manufactured by Fuji Silysia Chemical Company, under the tradename Sylysia™ and silica gels manufactured by Grace-Davison, under the tradenames Sylojet™, Syloid™.

The hydrophobic fillers include the surface-modified clays, surface-modified silicas, $TiO_2$ and surface-modified $TiO_2$, which have been rendered non-porous to water due to their surface modification with an organic moiety. Examples of surface-modified clays include surface-modified kaolinite clays sold under the tradename Kalophile-2™ by Dry Branch Kaolin and Lithoperse™ 7015HS and 7005CS by Huber Engineered Minerals, and Kaopolite SFO from Kaopolite, inc., which is no longer in production. A surface modified silica is AeroSil RX50 manufactured by Aerosil Nippon, located in Japan. Examples of surface-modified titanium dioxide are Tipure R104, manufactured by Dupont and Tioxide RXL, manufactured by Tioxide Americas.

In accordance with the present invention, hydrophobic fillers are preferred since they allow for excellent wet-scratch resistance while providing excellent ink gloss and graphics. Combinations of the hydrophobic and hydrophilic can also be used The epoxy binder is prepared by admixing the required amount of the emulsified epoxy resin and opacifying agents to the hardener, which has been diluted with water and/or alcohol to the desired concentration. Optional components such as secondary curing agents and wetting aids can also be added. The total solids concentration for the binder is generally dependent upon the coating application technique. In general, total solids concentrations of at least 5% up to about 50% are desirable, with 20% to 45% being more preferred.

The epoxy coating, filled or unfilled, and functional layers can be applied utilizing a standard coating technique to one or both sides of the film substrate. An example of a coating process is gravure coating which allows patterned application of the opacifying coatings to create a security window. The filler type and thickness of the epoxy coating is dictated by the targeted opacity, surface appearance, surface texture, and economics. Generally, the epoxy coating is applied to the film substrate after orientation at a dry coating weight of at least 0.1 grams/1000 in$^2$ (g/msi) per layer and normally not more than 4 g/msi per layer. The total epoxy coating weight, including filler, for opaque laminates is generally 0.3 to 5.0 g/msi per side and 4 to 8 g/msi per side for clear laminates. Generally, the total epoxy coating weight is about the same on each side of the laminate.

The coated substrate is subsequently passed through a hot air oven to remove the water and solvent present. Residence times from 1 to about 10 seconds in the oven between 140°–250° F. (60–120° C.) are usually sufficient.

Functional layers, such as antistatic layers, that provide antistatic properties, promote adhesion, contain security features, and/or provide additional opaciity can be applied to the film substrate before, in between and/or after coating with one or more epoxy dispersions. The antistatic layers can also be the epoxy layers. Examples of the primer for thermoplastic materials include poly(ethyleneimine), which can be coextruded with or coated on the plastic substrate, and the epoxy coating at a low coating weight following the teaching of U.S. Pat. No. 4,214,409, to Steiner et al. Corona, plasma or flame treating can also be used with or instead of the primer. PD95849MO1, manufactured by Adhesion Systems, Inc., is an example of an antistatic opacifying polyurethane that can be applied over, under, and/or between layers of epoxy coatings described in this invention.

It is also envisioned that the coated substrate can be embossed, dyed, printed, texturized or otherwise treated before or after lamination; this being done on the internal or external surfaces of the laminated layers, so as to provide, for example, visual and/or tactile identification of the nature of a banknote, its significance or value. Printing processes include, but are not limited to, lithography, UV-screen, flexography, gravure and intaglio printing processes. Any flexo or gravure printable ink, either colors or machine readable ink, such as lithographic, IR, UV, magnetic and intaglio inks, can be used. Printing on the core is also a security feature as well.

The laminating techniques which can be employed to effect the present invention are known in the art and include: adhesive-bonding or cementing, e.g., with laminating adhesive resins, preferably with a transparent agent; solvent-bonding, where a mist of solvent is sprayed over the surfaces to be bonded together; thermal lamination by heat-bonding where thermoplastic sheets are subject to a hot rolling or pressing operation; cast-lamination where one layer is cast onto the second and the second forms a substrate; or, extrusion or draw-lamination as in calendering operations known in the art.

The use of solventless or 100% solids adhesive resins, such as a two-part polyurethane resin, WD4110, available from H.B. Fuller Co., is particularly preferred. 100% solids laminating adhesives are an effective alternative to solvent-based adhesives. 100% solids laminating adhesives impart excellent clarity, enhancement of printing, high bond strength and heat sealing resistance to the multilayer film laminated structure of the present invention.

When discrete security devices are incorporated within the substrate, e.g., optically-variable devices (OVD's), they can be enclosed in pouches affixed to the substrate. On the other hand, the optically-variable devices themselves may be incorporated in one (or both) layers of the laminated substrate or between the layers, it not being necessary to incorporate a physically discrete device within a clearly defined pouch formed between the layers.

Any suitable security device can be employed in the present invention such as one selected from the group consisting of optically variable devices (OVDs), magnetic devices, electronic devices, and rare earth element-containing devices, with OVDs particularly preferred.

As employed in the present specification, the term "optically-variable" is used to denote any device which can readily be made to change appearance in a reversible, predictable and reproducible manner. The appearance of such devices may be altered, for example, by the application of body-heat or manual pressure, the variation of the angle of viewing and, the lighting conditions under which viewing takes place. The type of devices envisioned by the present invention are: diffraction gratings, liquid crystals, moire patterns and similar patterns produced by cross-gratings with or without superimposed, refractive, lenticular and transparent grids, such as Fresnel lenses, spaced partially-reflective, and partially transparent, coatings yielding variable interference patterns or the like, bi-refringent or polarizing layers, zone-plates and the like.

Generally, optically-active devices of this nature are readily recognized by unskilled persons and are yet extremely difficult to reproduce by photographic and printing techniques. Moreover the production of any one such device in a reproducible fashion and the incorporation of such a device in a plastic laminate as described by the present invention is likely to be beyond the resources of the great majority of would-be forgers. Where a flexible paper-like product such as a bank-note is sought, it is of course preferable that the optically-variable devices should, themselves, be sheet-like, flexible and thin; it is also preferable for such devices to be compatible with the plastic material employed for the laminae to facilitate bonding and mitigate against reactive changes occurring with time.

According to the present invention, one preferred form of optically variable device may be a reflecting diffraction grating consisting of a metallized thermoplastic film embossed with a diffraction pattern. To prevent access to the embossed pattern for the purpose of illicit replication, it is preferable according to the present invention to employ a layer of thermoplastic material on each side of the metallized film which has similar solubility characteristics to that of the metal layer so that separation by preferential etching will be rendered extremely difficult. Another preferred device is a moire pattern formed by photographically reproducing fine line or dot patterns on each side of a thin film. The spacings of the dots and lines can be readily made too fine to be reproduced by printing techniques and yet the moire pattern can be displayed upon a much larger scale. Unique diffraction and moire patterns will often be preferred for use in bank notes and techniques are available for producing those by computer and photo-reduction methods.

In the production of low denomination bank notes, a suitable level of security against counterfeiting may be obtained by merely providing a clear "window" through the bank note. As indicated above, such a window would ensure that a scanner or color copier could not copy the note. Additionally, other security features can be incorporated into or onto the bank note, including reverse printing of the note to protect the security devices and the print.

It has been found that films similar to those of the present invention but which are "cross-oriented," can be susceptible to curling at temperatures above 150° F. Such cross-oriented films are similar to those of the present invention except that the second layer is laminated to the film substrate so that the first (primary) direction of orientation of the second layer is substantially normal to the first (primary) direction of orientation of the first layer. It is believed that such curling can result from differences in shrinkage at high temperatures in the machine direction and transverse direction of each layer. Additional curling susceptibility can result where coatings or skins of the layers have different coefficients of contraction from the HDPE component of the layers. Such imbalanced contraction and its attendant curling can be avoided by counterbalancing the overall shrinkage properties of one layer by laminating thereto a second layer identical to the first layer which is provided as a mirror image of the first layer. In other words, one half of the layered film structure is a mirror image of the other, with the plane of symmetry being along the horizontal midline of the layered film structure cross-section. This provides a cross-sectionally symmetrical layered film structure. Examples of such films include those of ABA, ABBA, ABCCBA, ABCDCBA, etc. construction where each letter represents a film layer, skin, coating, or adhesive layer. Such a cross-sectionally symmetrical layered film structure is necessarily a "parallel-oriented" structure, i.e., the primary direction of orientation of the first layer is parallel to the primary direction of orientation of the second layer in order to meet the mirror image requirement. Such a construction provides a symmetrical structure wherein the opposing shrinkage forces counteract each other to a significant degree. However, such a two layer parallel construction can be susceptible to poor tear properties in one direction, e.g., TD where two TD oriented films are employed.

It has now been found that using a low density polyethylene (LDPE) and/or a linear low density polyethylene (LLDPE) laminating resin oriented in the primary direction of orientation which is substantially perpendicular to the primary direction of orientation of the layers which it ties, evinces reduced susceptibility to tearing. The laminating resin can itself be subjected to orienting to some extent during lamination, preferably after the resin has at least partially or completely solidified, and preferably in the machine direction. Such orienting can be from 1.5 to 10 times, preferably from 4 to 6 times, corresponding to a total drawdown of the laminating adhesive resin of greater than 10%, preferably greater than 20%, say, 75%.

It has also been found that by using a 100% solids resin as the laminating adhesive resin employed, orientation effects resulting from the lamination procedure are improved, resulting in a multilayer film exhibiting curl resistance and improved chemical resistance.

One or both of the HDPE containing layers may be weakened in terms of tear resistance in one direction to a point where they are significantly weaker than the laminating adhesive resin and the OPP containing core layer. When attempting to delaminate the structure for counterfeiting purposes, only small strips of the outer printed HDPE containing layers would be removed. The entire HDPE containing layers would not be removable.

The HDPE containing layer can be tear weakened using process conditions during manufacture. Microperforating with laser technology and/or nicking will also cause the HDPE containing layers to weaken. The microperforations are either diagonal or unidirectional, e.g. in the range of from about 50 to about 300 dots per inch (dpi).

The HDPE layers can also be tear weakened through the addition of incompatible additives that would cause the layer to fibrilate or fracture during orientation. Suitable incompatible polymer additives which effect crystallization include polyester (PET), polybutylene terephthalate (PBT), polystyrene or a mixture thereof. Generally, from about 1 to about 10 wt. %, preferably from about 4 to about 8 wt. % of incompatible additive is added to the HDPE layer(s). Fibrillation results in regions of oriented HDPE surrounding long, planar regions of the incompatible polymer resulting in low tear regions.

The OPP core layer is not weakened and essentially provides the tensile properties and tear resistance of the structure as a whole.

The invention is further illustrated by the following non-limiting examples in which all parts are by weight unless otherwise specified.

EXAMPLE 1

This example demonstrates the preparation of a multilayer film substrate produced in accordance with the present invention which is suitable for preparing banknotes having good dead fold characteristics.

A multilayer oriented film substrate having a 1.15 mil final thickness is prepared by coextruding HDPE with copolymer polypropylene skins on both sides to form a first layer (a). The HDPE employed is Oxychem M-6211, available from Occidental Chemical Corp., Dallas, Tex., having a density of 0.96 and a melt index of 1.0. The copolymer polypropylene skins comprise 90 wt. % Chisso 7510, an ethylene-propylene-butene-1 terpolymer, available from Chisso Corp. of Japan, and 10 wt. % Nobil LKA-753, a low density polyethylene available from Mobil Chemical Co., Norwalk, Conn. HDPE comprises about 90 wt. % of the resulting film layer (a) while the skins comprise 10 wt. % (5 wt. % on each side). The film (a) is then oriented 1.4 times in the MD at about 115° C. and 6 to 12 times, e.g. 10 times in the TD at about 115–140° C. in a tenter frame.

Layer (a) is 100% solids adhesively laminated to an OPP layer (b) described below using a two-part polyurethane resin, WD4110, available from H.B. Fuller Co.

The OPP layer is 1.15 mil final thickness prepared using FINA 3371 Homopolymer polypropylene in the core at 109 gauge units and two skin layers of 3 gauge units of Lyondell M60-30 high density polyethylene. The MG60-30 may contain processing aids and/or surface modifiers.

The two-ply layer is again 100% solids laminated with Fuller WD4110 to another HDPE layer described above.

EXAMPLE 2

This example demonstrates the preparation of a multilayer film substrate produced in accordance with the present invention which is suitable for preparing banknotes having good dead fold characteristics.

A multilayer oriented film substrate having a 1.15 mil final thickness is prepared by coextruding HDPE with copolymer polypropylene skins on both sides to form a first layer (a). The HDPE employed is Oxychem M-6211, available from Occidental Chemical Corp., Dallas, Tex., having a density of 0.96 and a melt index of 1.0. The copolymer polypropylene skins comprise 90 wt. % Chisso 7510, an ethylene-propylene-butene-1 terpolymer, available from Chisso Corp. of Japan, and 10 wt. % Nobil LKA-753, a low density polyethylene available from Mobil Chemical Co., Norwalk, Conn. HDPE comprises about 90 wt. % of the resulting film layer (a) while the skins comprise 10 wt. % (5 wt. % on each side). The film (a) is then oriented 1.4 times in the MD at about 115° C. and 6 to 12 times, e.g. 10 times in the TD at about 115–140° C. in a tenter frame.

Layer (a) is 100% solids adhesively laminated to an OPP layer (b) containing polybutylene terephthalate (1.20 mil OPPalyte™ 420 HTW) using a two-part polyurethane resin, WD4110, available from H.B. Fuller Co.

The two-ply layer is again 100% solids adhesively laminated with Fuller WD4110 to another HDPE layer described above.

The following materials are used in Examples 3, 4 and 5:

NSK7000 is an acidified aminoethylated interpolymer manufactured by Nippon Shokubai. The amine hydrogen equivalent weight is 250 /gram. This material is supplied at 50% solids.

MW900 is a dispersion of hydrophobic clay (Huber's Lithosperse 7015HS) in a dispersion of epoxidized Bisphenol A (Michemepoxy 82855, epoxy equivalent weight is about 188/gram). Michelman, Inc. manufactures MW900 and Michemepoxy 82855.

PD95849MO1 is a water-based, carboxylated urethane polymer containing titanium dioxide, manufactured by Adhesion Systems, Inc. in Paterson, N.J., at 56% solids.

AS 316[trimethylolpropane tris(2-methyl-1-aziridinepropionate), purchased from Adhesion Systems, Inc., reacts with the carboxyl moieties to cross-link the urethane polymer.

Isopropyl Alcohol is used to control foam and to improve the evenness of the coating.

MW960 is a dispersion of titanium dioxide (Tioxide Americas' RXL) in a dispersion of epoxidized Bisphenol A (Michemepoxy 82855, epoxy equivalent weight is about 188/gram). Michelman, Inc. manufactures MW960 and Michemepoxy 82855.

Sylysia 730 is a 3-micron silica gel manufactured by Fuji Silysia.

Daubond®42X6311 is the emulsified glycidyl ether of Bisphenol A manufactured by Daubert Chemical Company.

EXAMPLE 3

The three-ply laminate of Example 1 is coated on a ten-station Schiavi press to yield the following structure:

| | |
|---|---|
| Epoxy Print Cap filled with Hydrophobic Clay (~0.4 g/msi) | |
| Antistatic Opacifying Layer filled with Titanium Dioxide (~1.5 g/msi) | |
| Epoxy Opacifying Layer filled with Titanium Dioxide (~2.3 g/msi) | |
| Epoxy Opacifying Layer filled with Titanium Dioxide (~2.3 g/msi) | |
| Three-ply Laminate | |
| Epoxy Opacifying Layer filled with Titanium Dioxide (~2.3 g/msi) | |
| Epoxy Opacifying Layer filled with Titanium Dioxide (~2.3 g/msi) | |
| Antistatic Opacifying Layer filled with Titanium Dioxide (~1.5 g/msi) | |
| Epoxy Print Cap filled with Hydrophobic Clay (~0.4 g/msi) | |

Each layer is applied by a separate station of the press. No coatings are applied in stations #9 or #10. Each coating type is described below. The film goes over a turning bar after station #4.

Epoxy Print Cap: Applied in stations #4 (front) and #8 (back) with gravure cylinders (250 lines per inch).

| | |
|---|---|
| NSK7000 | 78.8 Lbs. |
| Demineralized Water | 74 Lbs. |
| MW900 | 163.9 Lbs. |
| Isopropyl Alcohol | 158.2 Lbs. |

When fully formulated, the ratio of hydrophobic clay to binder (epoxy plus hardener) is about 1:1.

Antistatic Opacifying Layer: Applied in stations #3 (front) and #7 (back) with gravure cylinders (250 lines per inch).

| | |
|---|---|
| PD95849MO1 | 500 lbs. |
| A316 Cross-linker | 7.5 lbs. |
| Water | 107.5 lbs. |
| Isopropyl alcohol | 70 lbs. |

In the completed formulation, the ratio of titanium dioxide to binder in the Antistatic Opacifying Layer is about 3:1.

Epoxy Opacifying Layer: Applied in stations #1 (front), #2 (front), #5 (back), and #6 (back) with gravure cylinders (150 lines per inch).

| | |
|---|---|
| MW960 | 300 Lbs. |
| NSK7000 | 96 Lbs. |
| Isopropyl alcohol | 78 Lbs. |

In the completed formulation, the ratio of titanium dioxide to binder in the Epoxy Opacifying Layer is about 2:1.

The coated film, prepared as described above, is sheeted and printed on automated equipment. The total thickness is about 0.0043 inches (4.3 mils).

EXAMPLE 4

The three-ply laminate of Example 1 is coated according to the method of Example 3. The following structure is prepared:

| |
|---|
| Epoxy Print Cap filled with Hydrophobic Clay (~1 g/msi) |
| Antistatic Opacifying Layer filled with Titanium Dioxide (~3 g/msi) |
| Antistatic Opacifying Layer filled with Titanium Dioxide (~3 g/msi) |
| Epoxy Layer (~0.2 g/msi) |
| Three-ply Laminate |
| Epoxy Layer (~0.2 g/msi) |
| Antistatic Opacifying Layer filled with Titanium Dioxide (~3 g/msi) |
| Antistatic Opacifying Layer filled with Titanium Dioxide (~3 g/msi) |
| Epoxy Print Cap filled with Hydrophobic Clay (~1 g/msi) |

Epoxy Layer: Used as an adhesion promoting primer for the Antistatic Opacifying Layer. Applied in station #1 and #5 with gravure cylinders (360 lines per inch).

| | |
|---|---|
| NSK7000 | 118.5 Lbs. |
| Demineralized Water | 254.5 Lbs. |
| Isopropyl Alcohol | 22.5 Lbs. |
| Daubond 42X6311 | 50 Lbs. |
| Sylysia 730 | 4.3 Lbs. |

Epoxy Print Cap: Similar to Example 1, but it contains an optional particulate. Applied in stations #4 and #8 with gravure cylinders (200 lines per inch).

| | |
|---|---|
| NSK7000 | 97.1 Lbs. |
| Demineralized Water | 77 Lbs. |
| Isopropyl Alcohol | 20 Lbs. |
| MW900 | 202 Lbs. |
| Sylysia 730 | 3.5 Lbs. |

When fully formulated, the ratio of hydrophobic clay to binder (epoxy plus hardener) is about 1:1.

Antistatic Opacifying Layer: Applied in stations #2, #3, #6 and #7 with gravure cylinders (150 lines per inch).

| | |
|---|---|
| PD95849MO1 | 500 lbs. |
| A316 Cross-linker | 7.5 lbs. |
| Water | 107.5 lbs. |
| Isopropyl alcohol | 70 lbs. |

In the completed formulation, the ratio of titanium dioxide to binder in the Antistatic Opacifying Layer is about 3:1.

This material is coated and sheeted on commercial-scale equipment. Very little ink set off is observed after printing several thousand sheets on an intaglio press. Set off is the transfer of ink from the freshly printed side of the sheet to the other side when the sheets are collected in a stack. The total thickness is about 0.0048 inches (4.8 mils).

EXAMPLE 5

The three-ply laminate of Example 2 is coated on a four-station Chesnut press to yield the structure below. Each layer is applied by a separate station of the press. No coatings are applied in Station #1. Each coating type is described below. The laminate is coated on one side then removed and coated on the other side. The opaque, cavitated core requires less opacifying coating than in Examples 3 and 4.

| |
|---|
| Epoxy Print Cap filled with Hydrophobic clay (~1 g/msi) |
| Antistatic Opacifying Layer filled with Titanium Dioxide (~3 g/msi) |
| Epoxy Layer (~0.2 g/msi) |
| Three-ply Laminate with Cavitated Center Layer |
| Epoxy Layer (~0.2 g/msi) |
| Antistatic Opacifying Layer filled with Titanium Dioxide (~3 g/msi) |
| Epoxy Print Cap filled with Hydrophobic Clay (~1 g/msi) |

Epoxy Print Cap: Applied in station #4 with gravure cylinder (180 lines per inch).

| | |
|---|---|
| NSK7000 | 78.8 Lbs. |
| Demineralized Water | 74 Lbs. |
| MW900 | 163.9 Lbs. |
| Isopropyl Alcohol | 158.2 Lbs. |

In the completed formulation the ratio of hydrophobic clay to binder (epoxy plus hardener) in the Epoxy Print Cap is about 1:1.

Antistatic Opacifying Layer: Applied in station #3 with gravure cylinder (150 lines per inch).

| | |
|---|---|
| PD95849MO1 | 500 lbs. |
| A316 Cross-linker | 7.5 lbs. |
| Water | 107.5 lbs. |
| Isopropyl alcohol | 70 lbs. |

In the completed formulation the ratio of titanium dioxide to binder in the Antistatic Opacifying Layer is about 3:1.

Epoxy Layer: Used as an adhesion promoting primer for the Antistatic Opacifying Layer. Applied in station #2 with a gravure cylinder (360 lines per inch).

| | |
|---|---|
| NSK7000 | 118.5 Lbs. |
| Demineralized Water | 254.5 Lbs. |
| Isopropyl Alcohol | 22.5 Lbs. |
| Daubond 42X6311 | 50 Lbs. |
| Sylysia 730 | 4.3 Lbs. |

This material is printed on a laboratory intaglio press. The print quality is excellent with no indication of lost opacity due to crushed cavitation. The total thickness is about 0.0042 inches (4.2 mils).

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A curl-resistant, cross-sectionally symmetrical, laminated multilayer film substrate for use in the production of banknotes and security papers comprising:

(a) an imbalanced biaxially oriented first layer having inner and outer sides, comprising at least about 50 weight percent of a high density polyethylene having a density of at least about 0.94, said first layer being oriented in at least a first direction to a degree which is at least three times less than the degree of orientation present in a second direction substantially normal to the first direction and wherein (a) further comprises a coextruded propylene copolymer skin on its inner side;

(b) a balanced biaxially oriented second layer having inner and outer sides, comprising at least about 90 wt % polypropylene, said second layer being oriented in at least a first direction at an orientation ratio of at least 4:1 and oriented in a second direction substantially normal to said first direction at an orientation ratio of at least 6:1;

(c) an imbalanced biaxially oriented third layer having inner and outer sides, comprising at least about 50 weight percent of a high density polyethylene having a density of at least about 0.94, said third layer being oriented in at least a first direction to a degree which is at least three times less than the degree of orientation present in a second direction substantially normal to the first direction; and (d) a laminating adhesive resin disposed between the inner sides of (a) and (c), said second layer being laminated to said first and third layers so that the first direction of orientation of said third layer is substantially aligned with the first direction of orientation of said first layer and wherein the outer sides of both (a) and (c) further comprise at least one (1) epoxy layer and at least one (1) antistatic layer, wherein the at least one (1) epoxy layer and at least one (1) antistatic layer may be the same layer or different layers.

2. The film substrate of claim 1 wherein the epoxy layer is the outermost layer.

3. The film substrate of claim 1 wherein the outer sides of both (a) and (c) further comprise at least two (2) epoxy layers.

4. The film substrate of claim 1 wherein the epoxy layer and the antistatic layer are the same layer.

5. The film substrate of claim 1 wherein said epoxy layer comprises the reaction product of an acidified aminoethylated vinyl polymer and an epoxy resin, wherein said epoxy coating has a total coating weight of 4 to 8 g/msi per side.

6. The film substrate of claim 1 wherein said epoxy resin is a glycidyl ether of a member selected from the group consisting of phenols, bisphenols, ring substituted bisphenols, resorcinol, hydroquinone, phenol formaldehyde novolac resins, polyoxypropylene glycol, ethylene glycol, propylene glycol, 1-4 butanediol, 1-6 hexanediol glycerol, glycol, lower alkyl substituted hydantoin and mixtures thereof.

7. The film substrate of claim 1 wherein said epoxy layer further comprises an ink print image.

8. The film substrate of claim 1 wherein said epoxy layer further comprises an opacifying agent selected from the group consisting of silica, clay, zinc oxide, tin oxide, talc, surface-modified clay, surface-modified modified silica, titanium dioxide, surface modified titanium dioxide and calcium carbonate.

9. The film substrate of claim 2 wherein an underlying epoxy layer comprises titanium dioxide and the outermost epoxy layer comprises hydrophobic clay.

10. The film substrate of claim 1 wherein (b) further comprises a cavitating agent.

11. The film substrate of claim 10 wherein said cavitating agent is selected from the group consisting of polybutylene terephthalate and calcium carbonate.

12. The film substrate of claim 1 wherein both (a) and (c) further comprise a copolymer polypropylene skin on at least one side thereof.

13. The film substrate of claim 1 wherein both (a) and (c) further comprise copolymer polypropylene skins on both the inner and outer sides thereof.

14. The film substrate of claim 1 wherein (d) comprises a solventless polyurethane adhesive.

15. The film substrate of claim 1 wherein (d) comprises a component selected from the group consisting of low density polyethylene (LDPE) and linear low density polyethylene (LLDPE).

16. The film substrate of claim 1 further comprising (e) a security device between (a) and (c).

17. The film substrate of claim 16 wherein said security device is selected from the group consisting of optically variable devices (OVDs), magnetic devices, electronic devices, and rare earth element-containing devices.

18. The film substrate of claim 1 further comprising (e) a security device printed on layer (b) prior to laminating with laminating adhesive resin (d).

19. The film substrate of claim 1 further comprising a clear window through the film substrate.

20. The film substrate of claim 10 wherein said epoxy layer comprises the reaction product of an acidified aminoethylated vinyl polymer and an epoxy resin, wherein said epoxy coating has a total coating weight of 0.3 to 5 g/msi per side.

21. The film substrate of claim 1 in the form of a bank note.

* * * * *